United States Patent
Perthen

[11] 3,803,518
[45] Apr. 9, 1974

[54] DEVICE FOR MEASURING LONG BORES OF SMALL INTERNAL DIAMETER

[76] Inventor: Johannes Perthen, Sedanstrasse 13, Hannover, Germany 3

[22] Filed: Nov. 9, 1971

[21] Appl. No.: 197,086

[30] Foreign Application Priority Data
Nov. 17, 1970 Germany............................ 2056480

[52] U.S. Cl.............................. 33/178 F, 33/178 E
[51] Int. Cl. ............................................. G01b 5/12
[58] Field of Search........... 33/178 R, 178 E, 178 F, 33/174 Q, 178 C

[56] References Cited
UNITED STATES PATENTS
| | | | |
|---|---|---|---|
| 3,436,836 | 4/1969 | Metevia............................ | 33/178 F |
| 2,514,355 | 7/1950 | Barnes.............................. | 33/178 F |
| 3,119,187 | 1/1964 | Meyer............................... | 33/178 A |
| 2,239,981 | 4/1941 | Terry................................ | 33/178 E |
| 1,465,295 | 8/1923 | Bartholdy......................... | 33/178 R |
| 3,555,689 | 1/1971 | Cubberly.......................... | 33/178 F |

Primary Examiner—John W. Huckert
Assistant Examiner—Jon W. Henry

[57] ABSTRACT

Device for measuring long bores of small internal diameter comprises measuring feeler means, a body rotatably connected to each end of the feeler means, centering means carried by each body for movements toward and away from the axis of rotation thereof, and means for effecting such movements of the centering means.

7 Claims, 3 Drawing Figures

PATENTED APR 9 1974  3,803,518

DEVICE FOR MEASURING LONG BORES OF SMALL INTERNAL DIAMETER

The invention relates to a device for measuring long bores of small internal diameter comprising a measuring feeler and means for centering the feeler in the bore.

For measuring bores of large diameter (for example gun barrels) a device is known (cf. British patent 565,504) in which the feeler is rotatably mounted on a cylindrical body which is adapted fairly accurately to the internal diameter of the bore to be measured. The actual centering of the feeler is effected by three centering members carried by the same mounting as the sensing pin of the feeler.

Such a construction is not suitable for measuring long bores of small internal diameter. For if the workpiece with the bore to be measured is rotated in order for example to continuously sense the bore spirally considerable torsional forces are transmitted via the centering members to the feeler and with the necessarily small dimensions present this leads to considerable errors in measurement. The longer the bores to be measured the greater the sensitivity of the feeler linkage to the aforementioned torsional forces transmitted by the centering members.

The problem underlying the invention is to avoid these disadvantages of the known constructions and to construct a device of the type mentioned at the beginning in such a manner that long bores of small internal diameter may also be measured with great accuracy and at high speed.

According to the invention this problem is solved in that the centering means are formed by two centering bodies which are provided in the region of the two ends of the feeler and mounted rotatably with respect to said feeler and which on rotation of the workpiece provided with the bore rotate with said workpiece relatively to the longitudinally displaceable feeler.

Thus, according to the invention the centering bodies are not non-rotatably connected to the feeler or the housing or linkage thereof but are mounted rotatably with respect to said members. Consequently, on rotation of the workpiece comprising the bore to be measured they can rotate with said workpiece whereas the feeler executes only a longitudinal displacement (the bore is then sensed helically).

Consequently, no torsional forces can be transmitted by the centering bodies from the rotated workpiece to the feeler or the housing or linkage of the latter. Although the sensing pins of the feeler contact with inner wall of the bore to be measured they bear on the inner wall with a substantially smaller pressure than the centering members and consequently no disturbing torsional forces are transmitted by the rotated workpiece through the sensing pins to the feeler.

Thus, the linkage of the measuring feeler according to the invention need take up substantially only the forces necessary for longitudinal displacement of the feeler. Therefore, even with a linkage of small diameter (as is necessary for measuring bores of small internal diameter) sufficient stability is ensured and an important requirement for high accuracy fulfilled.

One example of embodiment of the invention is illustrated in the drawings wherein.

Figures 1, 2, 3:
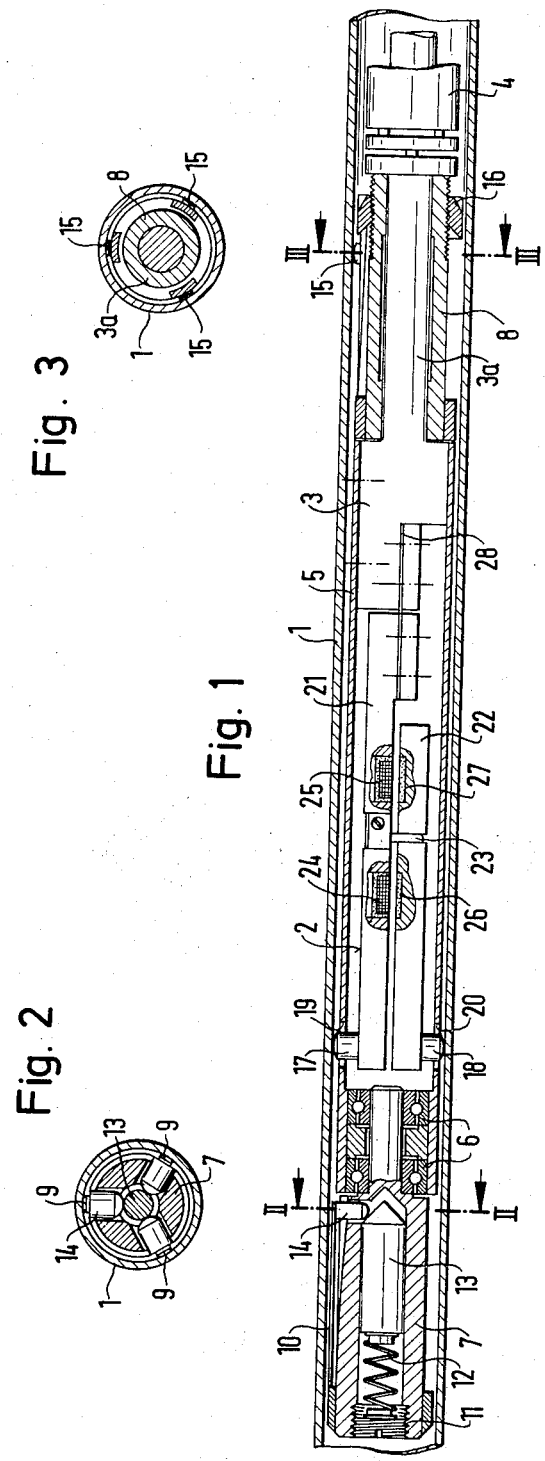
FIG. 1 is a longitudinal section through a measuring device according to the invention.
FIG. 2 is a section along the line II—II of FIG. 1.
FIG. 3 is a section along the line III—III of FIG. 1.

The device illustrated is intended for measuring the relatively narrow and long bore of a tubular workpiece 1. The device comprises a feeler 2 carried by a base body 3 which is connected to a linkage 4. The feeler 2 is mounted in a tubular housing 5 which carries at its free end two roller bearings 6 in which a centering body 7 is rotatably mounted. Disposed at the other end of the housing 5 is a centering body 8.

The centering body 7 carries at its periphery three centering elements 9 which are spaced from each other 120° and carried by leaf springs 10. The centering body 7 is also provided with an adjusting screw 11 which acts via a spring 12 on a pressure body 13 which in dependence upon its axial position via three radial pins 14 presses the centering members 9 to a varying degree outwardly. On rotating the screw 11 the centering members 9 can thus be set to the particular bore diameter and then bear with a predetermined selectable centering pressure on the inner wall of the bore.

The second centering body 8 comprises a sleeve which carries at its periphery three likewise sprung centering members 15 which may be set by means of a ring slide 16 to the particular bore diameter. The sleeve of the centering body 8 is freely rotatable and mounted on a cylindrical pin 3a of the base body 3.

The feeler 2 comprises two diametrically opposite sensing pins 17, 18 which pass through recesses 19, 20 of the housing 5 and bear on the inner wall of the bore of the workpiece 1. These sensing pins 17, 18 are disposed on the ends of two measuring levers 21, 22 which are movably connected together by means of a spring articulation 23.

In the example of embodiment illustrated the measuring lever 21 carries two coil systems 24, 25 and the measuring lever 22 is equipped with oppositely disposed ferromagnetic bodies 26, 27. The measuring lever 21 is mounted by means of a leaf spring articulation 28 on the base body 3.

On relative movement of the sensing pins 17 and 18 the air gaps between the coil system 24 and the ferromagnetic body 26 on the one hand and between the coil system 25 and the ferromagnetic body 27 on the other vary in the opposite sense. This results in an electrical quantity proportional to the change in diameter of the sensed bore. It is understood that within the framework of the invention it is possible to use a capacitive system instead of the inductive transducer illustrated.

To measure the bore along a helical path the workpiece 1 is turned and the feeler 2 displaced in the longitudinal direction by means of the linkage 4. The two centering bodies 7 and 8 follow the rotary movement of the workpiece 1 whereas the feeler 2 with its housing 5 does not execute a rotary movement. Apart from the negligible torque transmitted by the rotating workpiece 1 via the sensing pins 17 and 18 to the feeler 2, the latter and the housing 5, the base body 3 and following linkage 4 thus remain free from torsional stresses. In particular, no torsional forces are transmitted via the centering bodies 7 and 8 rotating with the workpiece 1.

I claim:

1. A device for measuring a small diameter bore of a workpiece comprising a housing having apertures between its ends and being of such diameter as to be accommodated in said bore; feeler means carried within said housing between its ends and extending through the apertures in said housing for engagement with the surface of the bore of said workpiece; a body at each end of said housing and being of such size as to be accommodated in said bore; centering means carried by each of said bodies beyond each end of said housing for adjustment radially thereof into and out of engagement with the surface of said bore to center said bodies and said housing within said bore; means carried by each of said bodies for moving said centering means into engagement with the surface of said bore; and means rotatably mounting said bodies at each end of said housing for enabling rotation of said bodies relative to said feeler means and to one another.

2. A device according to claim 1 wherein said feeler means comprises diametrically opposed sensing pins projecting through apertures in said housing, and lever means supporting each of said pins.

3. A device according to claim 2 including spring means acting on said lever means and enabling relative movement of said pins.

4. A device according to claim 2 including electrical means carried by said lever means and operable to sense relative movement of said pins.

5. A device according to claim 1 wherein the centering means of each of said bodies comprises three members angularly spaced uniformly from one another about the associated body.

6. A device according to claim 5 including spring means connecting said members to their associated body.

7. A device according to claim 6 wherein said adjusting means of one of said bodies comprises a tapered pin interposed between and engaging said members.

* * * * *